Oct. 5, 1965        P. H. SMITH          3,210,511
                      OVENS
                Filed Jan. 30, 1963

United States Patent Office 3,210,511
Patented Oct. 5, 1965

3,210,511
OVENS
Peter Harold Smith, Maidenhead, England, assignor to
J. Lyons & Company Limited
Filed Jan. 30, 1963, Ser. No. 254,925
Claims priority, application Great Britain, Feb. 2, 1962,
4,065/62; Nov. 13, 1962, 42,834/62
7 Claims. (Cl. 219—10.55)

This invention relates to ovens for heating articles of food and the like, using microwave electromagnetic radiation as the heating energy.

The invention is primarily concerned with an oven of small size such as an oven suitable for heating single articles of food, or at most a few articles of food, very quickly. Such an oven finds use in restaurants, stores, cafes and the like for rapidly heating an article of food to fulfill an order as and when an order is received. For example, in purveying hot dogs, it is often very convenient to be able to heat one sausage quickly, to fulfill one order, in contrast to the more usual practice of maintaining hot a large supply of sausages.

A small oven, fed with microwave power, is difficult to design for satisfactory operation, since the energy distribution within the enclosure of the oven will form static nodes and antinodes, giving rise to hot and cold spots in the oven and non-uniformity or uncertainty of heating of the product.

The present invention is concerned with an oven in which this effect is reduced or overcome and the invention includes an oven for heating food products and like small articles, comprising walls defining an enclosure for an article to be heated, a source of microwave energy and separate waveguides extending from said source to points on opposed walls of the enclosure, radiation means at said points for radiating energy into the enclosure, and means for supporting an article within said enclosure, so as to intercept energy radiated from said radiation means.

Figure 1:
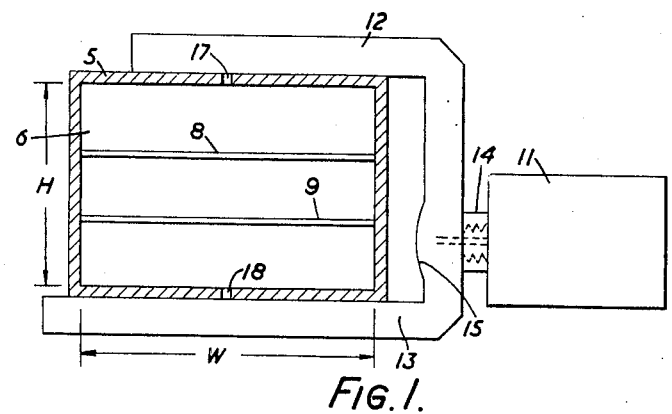
Figure 2:
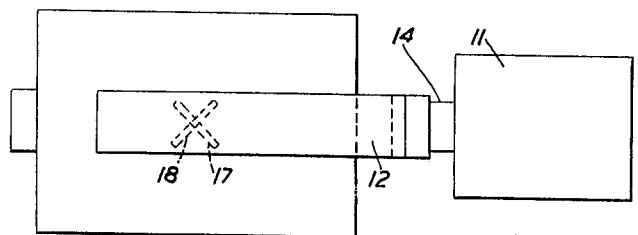
Figure 3:
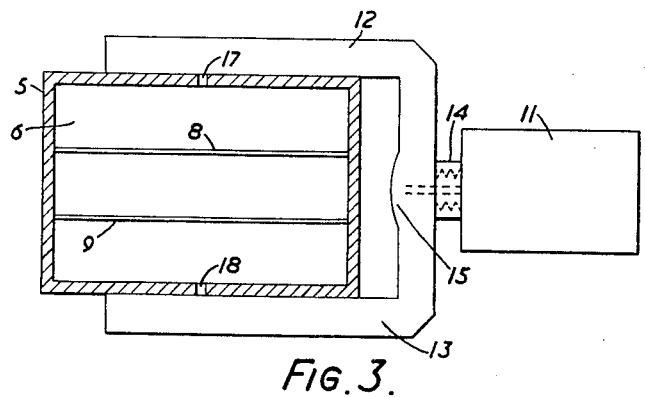

Other features and advantages of the invention will appear from the following description of embodiments thereof given by way of example, in conjunction with the accompanying drawings, in which:

FIGURE 1 shows a section through an oven constructed in accordance with the invention, FIGURE 2 shows a plan view of FIGURE 1, and FIGURE 3 is a section through a second form of oven.

The oven shown in FIGURES 1 and 2 comprises a hollow rectangular structure 5 which defines the oven enclosure 6. The enclosure has a suitable door on wall 7 of the oven, giving access to the interior. It is convenient to use a door structure of the kind described and claimed in an application Serial No. 254,944 filed January 30, 1963, by Dennis E. Eason. Shelves such as 8 and 9 are provided for an article to be heated, the article being located approximately midway between the top and bottom walls of the enclosure.

A microwave generator 11 provides energy which is fed to the oven by means of a double waveguide assembly 12, 13 extending to both the top and bottom walls, around the outside of the oven. The generator 11, conveniently a magnetron, is coupled into the waveguide at 14, and can be matched as to impedance by means of a mushroom dent 15.

Radiating or wave propagating means are provided at appropriate parts of the top and bottom walls. As shown, radiator slots 17 and 18 are used, arranged diametrically opposite each other, as seen in FIGURE 2, the two slots also being at right angles to each other. The radiation from the slots is accordingly polarised.

Further, the electrical path lengths between the source 11 and the slots are arranged to differ by an odd number of quarter wavelengths of energy of the source, conveniently one-quarter wavelength, so that radiation from the slots is 90° out of phase. The height H of the enclosure of the oven is made a whole number of wavelengths of the radiation and conveniently may be one wavelength. Since the planes of polarisation are at right angles, circularly polarised radiation is produced within the oven enclosure, avoiding node formation and effecting a uniform heating of the product.

The shelves 8 and 9 are of glass or similar dielectric material, and may therefore contribute or should be considered in securing impedance matching between the waveguides and the cavity formed by the oven enclosure.

In one example of the construction shown, a magnetron source 11 was used, operating at 2450 mc./s. The height H of the enclosure was 12 cms. high, which is one wavelength at this frequency; the width was 18 cms. The E-plane of propagation was used and the magnetron output about 1.4 kilowatts. With such an oven a sausage for a hot dog could be heated to about 170° F. in about 10 seconds.

With the form of the invention thus far described some loss of power may occur because of the difficulty of securing correct impedance match from the source to the article along both waveguide paths simultaneously. The form of construction shown in FIGURE 3 avoids this difficulty by making the two waveguide paths similar and symmetrical. In FIGURE 3 parts like to those of FIGURES 1 and 2 bear like references.

In FIGURE 3, the two waveguides 12 and 13 are matched to the source output connection and feed the enclosure through slots 17 and 18, again at right angles, so as to provide polarised radiation. The microwave energy coupled to the article still has an optimum strength midway between top and bottom walls.

By having a balanced waveguide system 12, 13 of which part of the waveguide wall is formed by the cavity material, the T match is now made to lie at a position midway between the two radiating slots 17 and 18, along the waveguide path. The resultant vector sum of the two polarised energy patterns allows a circular load, such as a hamburger, to be cooked or reheated from a frozen state without any loss of energy.

It has been found convenient to place the food product in a paper or plastic container during the cooking or reheating cycle. This over-wrapping ensures that the product does not dry out during the heating operation. Steam vapour from the product is retained in the container and by eventual condensation the product is kept moist. Since steam surrounds the product a more uniform temperature distribution is realised.

I claim:

1. An oven for heating food products and like small articles, comprising walls defining an enclosure for an article to be heated, a source of radio frequency energy, separate waveguides extending from said source to diametrically opposite points on opposed walls of the enclosure, radiation means at one of said points for radiating energy derived from said source and polarized in one plane into the enclosure, radiation means at the other of said points for radiating energy derived from said source and polarized in a plane perpendicular to the said one plane into the enclosure, and means for supporting an article within said enclosure so as to intercept energy radiated from both said radiation means.

2. An over according to claim 1 wherein the waveguides have relative electrical path lengths such that the two radiation means radiate their energies 90° out of phase with each other.

3. An oven according to claim 1 wherein the radiating means comprise slot radiators located opposite one another and inclined to each other at right angles.

4. An oven according to claim 1 wherein the waveguides are symmetrical with each other and have similar path lengths.

5. Microwave oven equipment comprising walls defining a heating enclosure, each of two opposed ones of said walls having a slot, said slots being diametrically disposed and mutually perpendicular, a magnetron, means for electromagnetically coupling said magnetron to said enclosure via said slots, and a dielectric support for an article to be heated within said enclosure.

6. Equipment according to claim 5 wherein said coupling means comprise a pair of waveguides having different lengths such that an article on said support receives waves combining to form a circularly polarized wave.

7. Equipment according to claim 5 wherein the magnetron and said coupling means are symmetrically disposed with respect to said walls defining said heating enclosure.

References Cited by the Examiner
UNITED STATES PATENTS

| | | | |
|---|---|---|---|
| 2,716,694 | 8/55 | Schroeder | 219—10.55 |
| 2,762,893 | 9/56 | Long et al. | 219—10.55 |
| 3,056,877 | 10/62 | Schmidt et al. | 219—10.55 |

OTHER REFERENCES

Heyne, German application 1,134,779, printed August 16, 1962 (Kl 21 h 36).

RICHARD M. WOOD, *Primary Examiner.*